United States Patent [19]

Fujita

[11] Patent Number: 5,032,914
[45] Date of Patent: Jul. 16, 1991

[54] MOVEMENT DETECTION AND Y/C SEPARATION CIRCUIT FOR DETECTING A MOVEMENT IN A TELEVISION DISPLAY PICTURE

[75] Inventor: Satoshi Fujita, Osaka, Japan

[73] Assignee: NEC Home Electronics Ltd., Osaka, Japan

[21] Appl. No.: 458,509

[22] Filed: Dec. 28, 1989

[30] Foreign Application Priority Data

Dec. 28, 1988 [JP] Japan .............................. 63-332084
Dec. 28, 1988 [JP] Japan .............................. 63-332085
Dec. 30, 1988 [JP] Japan .............................. 63-333461
Dec. 30, 1988 [JP] Japan .............................. 63-333462

[51] Int. Cl.$^5$ .................. H04N 7/18; H04N 9/74; H04N 7/12
[52] U.S. Cl. .................. 358/105; 358/22; 358/136; 358/21 R
[58] Field of Search .................. 358/105, 21 R, 136, 358/22

[56] References Cited

U.S. PATENT DOCUMENTS 4,794,454 12/1988 Sugiyama et al. .................. 358/105
4,811,092 3/1989 Achiha et al. .................. 358/105
4,924,305 5/1990 Nakayama et al. .................. 358/105
4,930,012 5/1990 Fujita .................. 358/105

Primary Examiner—John K. Peng
Attorney, Agent, or Firm—Cushman, Darby & Cushman

[57] ABSTRACT

An arrangement for detecting movement in a picture displayed on a television display. Y/C color separation detects movement in a displayed picture by generating a first movement detection signal with respect to luminance, a second movement detection signal with respect to luminance and a movement detection signal with respect to color. The first movement detection signal with respect to luminance represents the difference between a luminance signal extracted by Y/C separation in a first frame and a luminance signal extracted by Y/C separation in a second, adjacent frame. The second movement detection signal serves as an auxiliary detection signal, and indicates any leaking of the color signal into the luminance signal after Y/C separation. The auxiliary signal, which indicates the leakage of any color signal into the luminance signal, is able to minimize erroneous detection of movement due to leakage of the color signal.

15 Claims, 7 Drawing Sheets

MOVEMENT DETECTION AND Y/C SEPARATION CIRCUIT FOR DETECTING A MOVEMENT IN A TELEVISION DISPLAY PICTURE

BACKGROUND OF THE INVENTION

1. Field of the Invention

The present invention relates to the detection of movement in a picture displayed by a television display.

2. Description of the Related Art

Television receivers have various processing standards including NTSC, IDTV, and EDTV (similar to NTSC). These standards have various picture quality functions including Y/C-separation, interpolation between scanning lines, noise rejection, contour correction, and flare correction. These functions are carried out by using correlation techniques between adjacent display lines in a display frame, as well as correlation techniques between adjacent display frames.

As a picture moves on a television display, a picture movement in space in a vertical direction (with respect to the direction of the display lines) may be quite slow at many portions within the display picture, indicating that the video signals of the adjacent lines are quite similar to each other. A high similarity between the video signals of adjacent lines indicates a high correlation between the adjacent lines. Similarly, if at many portions within the display picture there exists a slow change (movement) in time, the video signals of the adjacent frames will be very similar to each other. This high similarity between the video signals of adjacent frames results in a high correlation between the frames.

A conventional picture processing circuit for improving picture quality which uses the correlations both between the adjacent lines and between the adjacent frames will usually have, for example, a movement detection unit that detects a change of the picture in space in the vertical direction or with respect to time. This movement detection unit may often be used to determine the correlation between adjacent lines and the correlation between adjacent frames.

A conventional movement detection circuit is shown in FIG. 1. The conventional movement detection circuit includes an A/D conversion circuit 150, a movement detecting unit 152, and a color signal movement detecting unit 154.

The color signal movement detecting unit 154 includes a color signal sampling unit 156 for sampling the color signal from the present line of the present frame, a color signal sampling unit 158 for sampling the color signal from the same corresponding line of the preceding frame, a frame delay circuit 160 for providing the video signal with a delay time enough for one frame (in this case, 524 lines), a subtractor 162, a low-pass filter circuit 164 and an absolute value circuit 166.

A video signal is digitized by A/D conversion circuit 150, and a color signal C is separated from the digitized video signal by a comb filter, which is made up of a one-line delay circuit 156a and a subtractor 156b. The color signal C passes through a band pass filter circuit 156c having a center frequency equal to the color subcarrier frequency (fsc), and then an absolute value circuit 156d. The output of the absolute value circuit 156d is supplied to one of the input terminals of the subtractor 162. At the same time, the color signal C is separated from the video signal on a similar line of a preceding frame that has passed through the frame line delay circuit 160 by a comb filter formed of a one-line delay circuit 158a and a subtractor 158b. The color signal then passes through a band pass filter circuit 158c and an absolute value circuit 158d. The output of the absolute value circuit 158d is supplied to another input terminal of subtractor 162. A difference signal $\Delta C$ of the color signal between the frames is output from the subtractor 162 to a low-pass filter circuit 164 and an absolute value circuit 166. The absolute value circuit 166 outputs a movement detection signal of the color signal to an input terminal of a maximum value selection circuit 168.

Color signals of corresponding lines of adjacent frames are reversed in phase with respect to each other; thus the subtractor 152a provides a difference signal $\Delta Y$ which is indicative of the difference in the luminance signals between frames, and the color signal having an amplitude of 2C. The difference signal $\Delta Y$ (including the color signal component) of the luminance signal between frames is output from the subtractor 152a to a low-pass filter circuit 152b for rejecting the high-frequency color signal and an absolute value circuit 152c. The absolute value circuit 152c outputs a movement detection signal of the luminance signal to a second input terminal of the maximum value selecting circuit 168. The maximum value selecting circuit 168 compares the movement detection signal of the color signal with the movement detection signal of the luminance signal and outputs the larger of the two as an ultimate movement detection signal.

The conventional movement detection circuit shown in FIG. 1 suffers from a disadvantage caused by leaking of the color component into the lower-frequency luminance component of the video signal. Since the luminance signal component is generally in a lower frequency range than the color signal component of a video signal, the lower frequency end of the color signal leaks into the movement detection signal of the luminance signal so that a false movement is detected. Also, the rejection characteristic of the low-pass filter circuit 152b is insufficient to fully eliminate the color signal component 2C, so that the color signal appears in the frequency range of the luminance signal. Thus the color signal component cannot be completely rejected. Particularly, the leakage of the color signal tends to occur at the interface portion of magenta and green of the color bar signal, causing picture quality deterioration such as dot interference.

The conventional movement detection circuit shown in FIG. 1 may erroneously detect movement of the color signal when the leakage level of the luminance signal that leaks into the color signal increases. Thus, the conventional movement detection circuit may indicate movement in the color signal, when in fact no such movement has occurred.

This potential for erroneous reading in the ultimate movement detection signal output from the maximum value detecting circuit 168 causes additional problems when a synthesis ratio is generated in response to the ultimate movement detection circuit in order to synthesize Y/C separated color and luminance signals. In practice, the synthesis ratio is usually controlled by detecting only the movement in time of the video signal.

FIG. 2 shows a conventional movement following-type Y/C separation circuit. An A/D converter 170 digitizes the NTSC signal and outputs the digitized signal to a comb filter 172. A line delay circuit 172a and 172b delay the digitized signal by one line. An adding circuit 172c provides an average value (Y-C) of the digitized signal and a digitized signal delayed by two lines output from the line delay circuit 172b. The subtraction circuit 172d subtracts the average value (Y-C) with a line delayed by line delay circuit 172a, hereinafter referred to as the reference line of a first frame. The subtraction circuit 172d divides in half the result of subtraction between the average value (Y-C) and the video signal on the reference line (Y+C) to output a color signal $C_1$. The color signal $C_1$ is produced when the video signal undergoes Y/C separation on the basis of correlation between the lines.

The reference frame is delayed one frame by a frame delay circuit 174, which essentially is a 524-line delay circuit, and a line delay circuit 176. The reference line of the delayed frame (e.g., the second frame) is subtracted from the reference line of the first frame by a subtracting circuit 178. The subtracting circuit 178 divides the subtraction result by two and outputs a color signal $C_1$ which has undergone Y/C separation on the basis of the correlation between the first frame and the second frame.

The color signal $C_1$ which was Y/C separated based upon correlation between the lines and the color signal C, which was Y/C separated based upon correlation between the frames are both input into a color movement following synthesis circuit 180. The ultimate movement detection signal from FIG. 1 is input to the color movement following synthesis circuit 180 to dynamically vary a synthesis ratio. The color movement following synthesis circuit synthesizes a synthesized color signal from the color signals $C_1$ and $C_1$ in accordance with the synthesis ratio and outputs the synthesized color signal to output terminal OC.

The corresponding Y/C separated luminance signal, hereinafter the corrected luminance signal, is generated by a subtractor 182 by subtracting the synthesized color signal from the video signal in the reference line (Y+C) of the first frame. The subtractor 182 divides the subtraction result by two and outputs the corrected luminance signal to output terminal OY.

In addition to the disadvantages of relying on an inaccurate ultimate movement detection signal, the Y/C separation circuit of FIG. 2 uses the frame delay circuit 174 separate from the frame delay circuit 160 of the movement detection circuit in FIG. 1. As a result, the use of two separate memory delay circuits causes increased complexity and costs. Thus, in order to implement the prior art devices in hardware, it would be necessary to provide: the A/D converter 150, the comb filters 156 and 158, and the frame delay 160 on a first IC chip; the remainder of the movement detection circuit on a second IC chip; the A/D converter 170, the comb filter 172 and the frame delay 174 on a third IC chip; and the remainder of the Y/C separation circuit on a fourth IC chip.

Therefore, the hardware implementation of the prior art devices suffers substantial problems with printed circuit boards and mounting space, thus increasing costs and causing added reliability problems.

SUMMARY OF THE INVENTION

In view of the shortcomings of the above-described device in the related art, a primary object of the present invention is to provide an apparatus which does not erroneously detect movement due to leakage of the color component signal into the lower-frequency luminance component of the video signal.

It is also an object of the present invention to provide an apparatus which generates an auxiliary detection signal indicating a difference between frames of color components which have leaked into the corresponding Y/C separated luminance signals.

It is a further object of the present invention to provide an apparatus which generates, in accordance with first and second movement detection signals with respect to luminance and a movement detection signal with respect to color, a maximum value signal representing maximum movement after color separation, and which generates a synthesis ratio indicating an amount of deterioration in a correlation between adjacent display lines or adjacent display frames.

It is still a further object of the present invention to provide an apparatus which generates an auxiliary movement detection signal based upon a difference between corresponding video signals in adjacent frames which have not undergone Y/C separation, and which in response thereto generates a synthesis ratio indicating an amount of deterioration in a correlation between adjacent display lines or adjacent display frames.

It is also an object of the present invention to provide an apparatus which provides accurate Y/C separation and movement detection and which can be mounted on a single IC chip.

These and other objects are achieved by providing an apparatus according to the present invention which generates a first movement detection signal with respect to luminance, a second movement detection signal with respect to luminance, and a movement detection signal with respect to color.

The first movement detection signal with respect to luminance represents the difference between a luminance signal extracted by Y/C separation in a first frame and a luminance signal extracted by Y/C separation in a second, adjacent frame. The second movement detection signal serves as an auxiliary movement detection signal, and indicates any leaking of the color signal into the luminance signal which may occur after Y/C separation. By indicating the leakage of any color signal into the luminance signal, the present invention is able to minimize erroneous detection of movement due to leakage of the color signal.

Normally, when there is high correlation between adjacent frames and lines, the first movement detection signal will accurately determine the occurrence of movement. However, as correlation deteriorates, the auxiliary movement detection signal is able to more accurately determine the occurrence of movement. Thus, the auxiliary movement detection signal not only minimizes erroneous detection of movement due to leakage of the color signal, but also indicates the occurrence of movement as correlation between the frames and lines deteriorates.

According to first and second embodiments of the present invention, an apparatus for detecting a movement in a television display picture includes first and second comb filters for Y/C separating luminance signals and color signals from first and second frames, respectively. A first difference circuit compares Y/C separated luminance signals from the first and second frames, and after rejecting the high-frequency color component outputs a first movement detection signal with respect to luminance. A second difference circuit compares low frequency components of Y/C separated color signals (e.g., the leaked residual low-frequency luminance signals) from the first and second frames, and after rejecting the high-frequency color component outputs a second movement detection signal with respect to luminance. A maximum value detector outputs, for example, the greater of the first or second movement detection signal as the ultimate movement detection signal with respect to luminance, which serves as an accurate indicator of movement. Thus, any errors due to deterioration of correlation are prevented.

According to the second embodiment of the present invention, the ultimate movement detection signal with respect to luminance is compared with a movement detection signal with respect to color, and an ultimate movement detection signal is generated. The ultimate movement detection signal, the color signal from the first comb filter and an average color signal from the reference lines of the first and second frames are compared, and a synthesized color signal and corrected luminance signal are output. As a result, the movement, color and luminance information can be accurately obtained without errors due to deterioration in correlation.

According to third and fourth embodiments of the present invention, an apparatus for detecting a movement in a television display picture includes first and second comb filters for Y/C separating luminance signals and color signals from first and second frames, respectively. A first difference circuit compares Y/C separated luminance signals from the first and second frames, and after rejecting the high-frequency color component outputs a first movement detection signal with respect to luminance. A second difference circuit compares the reference lines of the first and second frames before Y/C separation, and after rejecting the high-frequency color component outputs a second movement detection signal with respect to luminance. A maximum value detector outputs the greater of the first or second movement detection signal as the ultimate movement detection signal with respect to luminance. Three correlation detectors are provided to determine the level of deterioration of the correlation; after the level of deterioration is determined, a second maximum value selector compares the ultimate movement detection signal with respect to luminance with a weighted value, selected in response to the detected deterioration of correlation, of the movement detection signal with respect to color. Thus, any errors due to deterioration of correlation are prevented.

According to the third embodiment of the present invention, the correlation detectors analyze the low-frequency luminance components of the difference between the lines adjacent to the reference line in the first frame, and the low-frequency luminance components of the averages of the respective lines between frames.

According to the fourth embodiment of the present invention, the correlation detectors analyze the high-frequency components of the averages between the luminance components between frames both before and after Y/C separation.

Thus, the present invention provides an apparatus which accurately detects movement in a television display picture, even when there may be a deterioration of correlation between the lines or the frames.

BRIEF DESCRIPTION OF THE DRAWINGS

Preferred embodiments of the invention will be described in detail with reference to the drawings wherein like reference numerals denote like or corresponding parts throughout, wherein.

DETAILED DESCRIPTION OF THE PREFERRED EMBODIMENTS

First Embodiment

Figure 3:
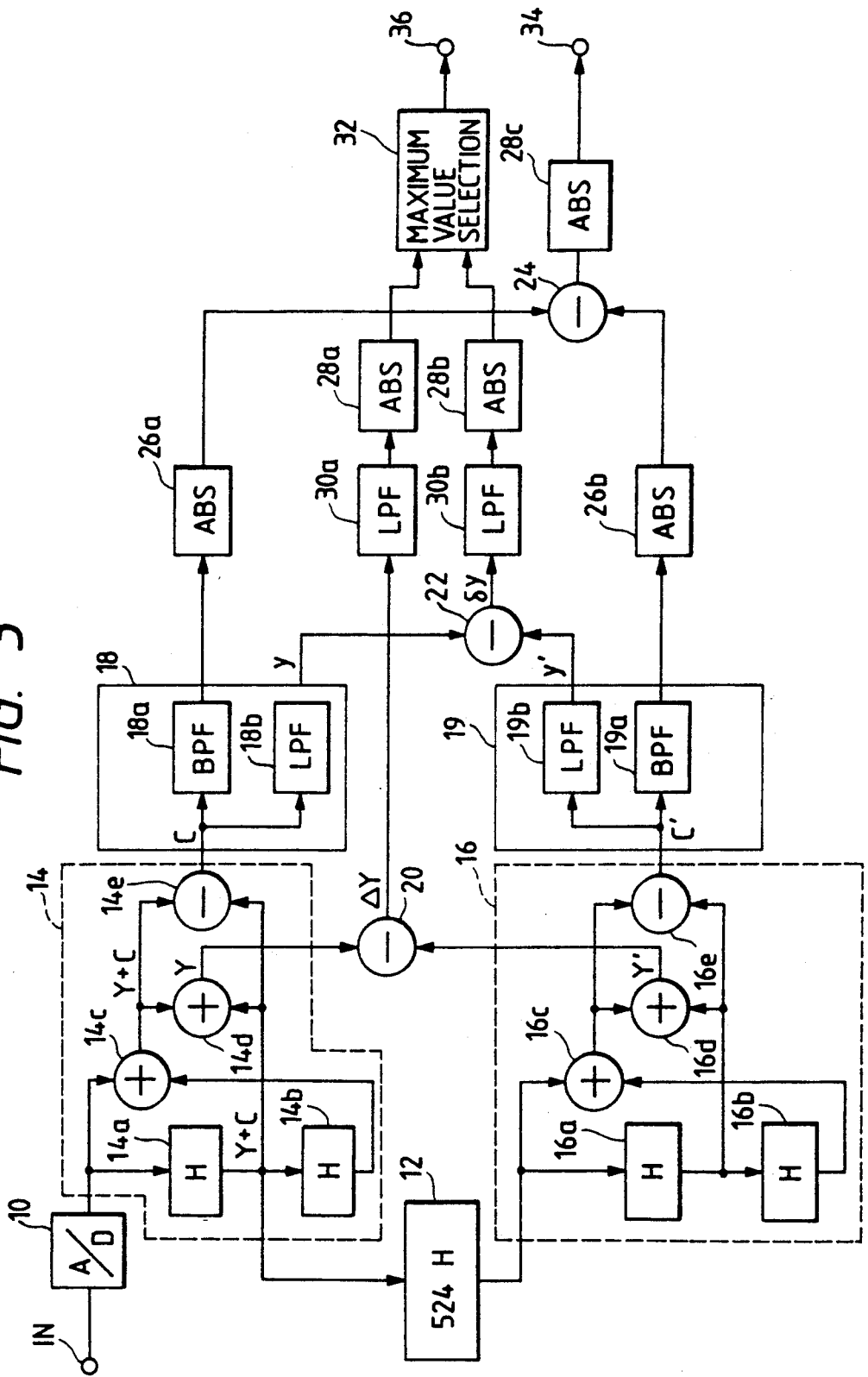
FIG. 3 is a diagram of a first embodiment of the present invention.

FIG. 3 is a block diagram showing a first embodiment of a movement detection circuit according to the present invention.

The movement detection circuit is provided with an A/D conversion circuit 10, a frame delay circuit 12, a comb filter 14 used for Y/C-separation of the video signal of the present frame, a comb filter 16 used for Y/C-separation of the video signal of a preceding frame, filters 18, 19, subtractors 20, 22, 24, absolute value circuits 26a, 26b, 28a, 28b, 28c, lowpass filters 30a, 30b, and a maximum value selecting circuit 32.

The comb filter 14, which performs Y/C-separation of the video signal of the first or present frame, is formed of cascaded one-line delay circuits 14a and 14b, each of which provides the video signal of the first frame a delay time long enough for one line; the comb filter 14 also includes adding circuits 14c, 14d, and a subtractor 14e. Likewise, the comb filter 16, which performs Y/C-separation of the video signal of the second or preceding frame, is formed of cascaded one-line delay circuits 16a and 16b, each of which provides the video signal of the second frame a delay time equal to one line; the comb filter 16 also includes adding circuits 16c, 16d, and a subtractor 16e.

The television video signal supplied to the input terminal IN, in this embodiment an NTSC standard signal, is converted into a digital signal of, for example, eight-bit widths by being sampled by the A/D conversion circuit 10 at a sampling frequency (4fsc) four times higher than that of the color subcarrier. The digitized signal is then supplied to the comb filter 14. The adding circuit 14c adds the digitized video signal directly from the A/D conversion circuit 10 to a video signal which has passed through the one-line delay circuits 14a and 14b. The video signal which has passed through the one-line delay circuits 14a and 14b has a delay time equal to two lines.

The adding circuit 14c shifts the result of addition by one bit to the lower bit side, divides the result of addition by two, and outputs a half of the result of addition. It should be noted that unless otherwise indicated, all the other adding circuits or subtraction circuits described divide the result of addition or subtraction by two and output the half of the result of the addition or subtraction. Thus, assuming that the line containing the video signal (Y+C), outputted from the one-line delay circuit 14a, is defined as a reference line and the correlation between the adjacent lines is 100%, the output of the adding circuit 14c represents the average value (Y-C) of the video signals of the two lines immediately before and after the reference line. For notation purposes the polarity (−) of the color signal C indicates that the phase of the color signal C is opposite to that of the video signal on the reference line. Therefore, the adding circuit 14d outputs the average value Y of the luminance signal contained in the video signals on the reference line and the lines immediately before and after the reference line. The average value Y is supplied to one of the terminals of the subtractor 20.

The subtractor 14e outputs the average value C of the color signal contained in the video signals on the reference line and the lines immediately before and after the reference line.

The average value C output by the subtractor 14e includes a luminance signal component y in the low frequency range which leaks into the average value C of the color signal as correlation between the lines deteriorates. The luminance signal component y is rejected by a band pass filter circuit 18a (BPF) in the following filter 18. The center frequency of the band pass filter circuit 18a is set to the color subcarrier frequency (fsc). The high-frequency component of color signal C outputted from the band pass filter circuit 18a (BPF) is converted by the absolute value circuit 26a into a color signal of non-polarity that carries only amplitude information and is fed to one of the input terminals of the subtractor 24.

The luminance signal component y from the average color signal C is passed by a low-pass filter circuit 18b (LPF) in the filter 18. Thereafter the low-frequency component of the average color signal C (e.g., the luminance signal component y) is supplied to the one of the inputs of the subtractor 22.

The output of the one-line delay circuit 14a in the aforementioned comb filter 14 is supplied as a video signal of the second (e.g., preceding) frame to the comb filter 16 via the frame delay circuit 12. In this embodiment, the frame delay circuit 12 delays the video signal by 524 lines. The comb filter 16, the succeeding filter 19 and absolute value circuit 26b are of the same construction as the aforementioned comb filter 14, the filter 18, and the absolute value circuit 26a, respectively. At these respective circuits, the same processing as for the video signal of the first frame mentioned above is performed for the video signal of the second frame.

Thus the adding circuit 16d in the comb filter 16 outputs an average value Y' of the luminance signal contained in the video signals on the reference line and two adjacent lines immediately before and after the reference line in the picture of the second frame. This average value Y' is supplied to a second input of the subtractor 20. The color signal C' separated from the video signal on the reference line of the low frequency luminance signal component y'. The low frequency luminance signal component y' is rejected by the band pass filter 19a (BPF) in the filter 19. Thereafter the high-frequency component of the color signal C' is converted by the absolute value circuit 26b into a color signal of non-polarity having only an amplitude information; the color signal of non-polarity is then supplied to a second input terminal of the subtractor 24. The low-frequency luminance signal component y', which leaks into the color signal C' as the correlation between lines deteriorates, is extracted by a low-pass filter 19b (LPF) in the filter 19. The low-frequency component of the color signal C' (e.g., the luminance signal component y') is then supplied to a second input terminal of the subtractor 22.

As a result, the subtractor 24 outputs the difference ΔC between the color signal C separated from the video signal on the reference line of the first frame and the color signal C' separated from the video signal on the reference line of the second frame. The difference ΔC is outputted via an absolute value circuit 28c as a movement detection signal with respect to the color signal in the display picture to the output terminal 34.

The subtractor 20 outputs the difference ΔY between the luminance signal Y separated from the video signal on the reference line of the first frame and the luminance signal Y' separated from the video signal on the reference line of the second frame. The difference ΔY in the luminance signal between frames passes through a low-pass filter 30a which removes the color signal component in the high frequency range contained in ΔY. The low frequency component of the difference ΔY is input to an absolute value circuit 28a to generate a signal of non-polarity, thereby converting the low frequency component of the difference ΔY into a first movement detection signal with respect to the luminance signal. The first movement detection signal is then input into one of the inputs of a maximum value selection circuit 32.

A subtractor 22 provides a second difference δy between the adjacent frames, i.e., the difference between a low frequency component y of the luminance signal which leaked into the color signal C from the first frame, and a low frequency component y' of the luminance signal which leaked into the color signal C' from the second frame. The second difference δy between the adjacent frames passes through a low-pass filter 30b which removes the color signal component in the high frequency range contained in δy. The low frequency component of the difference δy is input to an absolute value circuit 28b to generate a signal of non-polarity, thereby converting the low frequency component of the difference δy into a second movement detection signal with respect to the luminance signal. The second movement detection signal is then input into a second input of the maximum value selection circuit 32.

The maximum value circuit 32 compares the magnitude of the first movement detection signal with that of the second movement detection signal to output the larger as an ultimate movement detection signal with respect to the luminance signal to the output terminal 36.

As described above, the first movement detection signal is a difference signal between frames with respect to the average value of the luminance signals on the reference line and the adjacent lines immediately before and after the reference line. The second movement detection signal is a signal indicative of the difference between frames, with respect to the luminance signal leaked into the color signal C with increasing deterioration of the correlation between the adjacent lines. Thus, during times where there is relatively high correlation between lines or frames in a display picture, the first movement detection signal will normally be larger than the second movement detection signal; therefore the first movement detection signal will normally be selected by the maximum value selection circuit 32 as the ultimate movement detection signal with respect to the luminance signal. In this manner, by deriving the first movement detection signal as the low frequency component of difference signal $\Delta Y$, which compares between adjacent frames the average luminance signal over the three lines, the first movement detection signal provides an accurate detector of movement while minimizing the effect due to the leakage of color signals and effects due to noise.

However, during times when the correlation deteriorates between lines or frames, detection of a special movement within the display picture may be practically impossible by the first movement detection signal because of the above-mentioned averaging process. Thus, during times when there is increasing deterioration of correlation, it is preferable to detect movement using the second movement detection signal. Therefore, during times of increasing deterioration of correlation, the maximum value selection circuit 32 will select the second movement detection signal to be the ultimate movement detection signal with respect to the luminance signal. Thus, during times of increasing deterioration of correlation, the second movement detection signal acts as an auxiliary detection signal.

Figure 1:
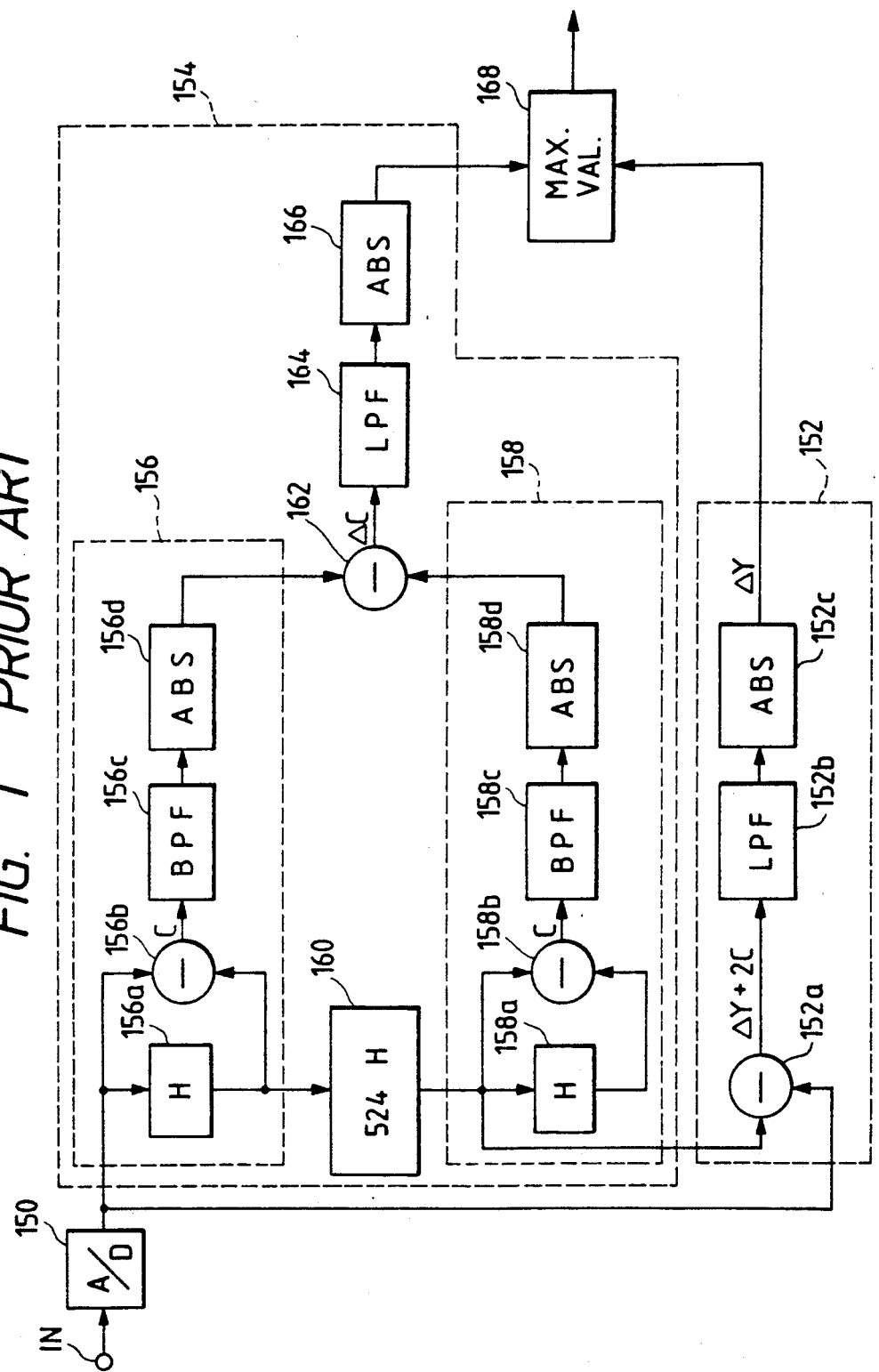
FIG. 1 is a block diagram (PRIOR ART) of a conventional movement detection circuit.
Figure 2:
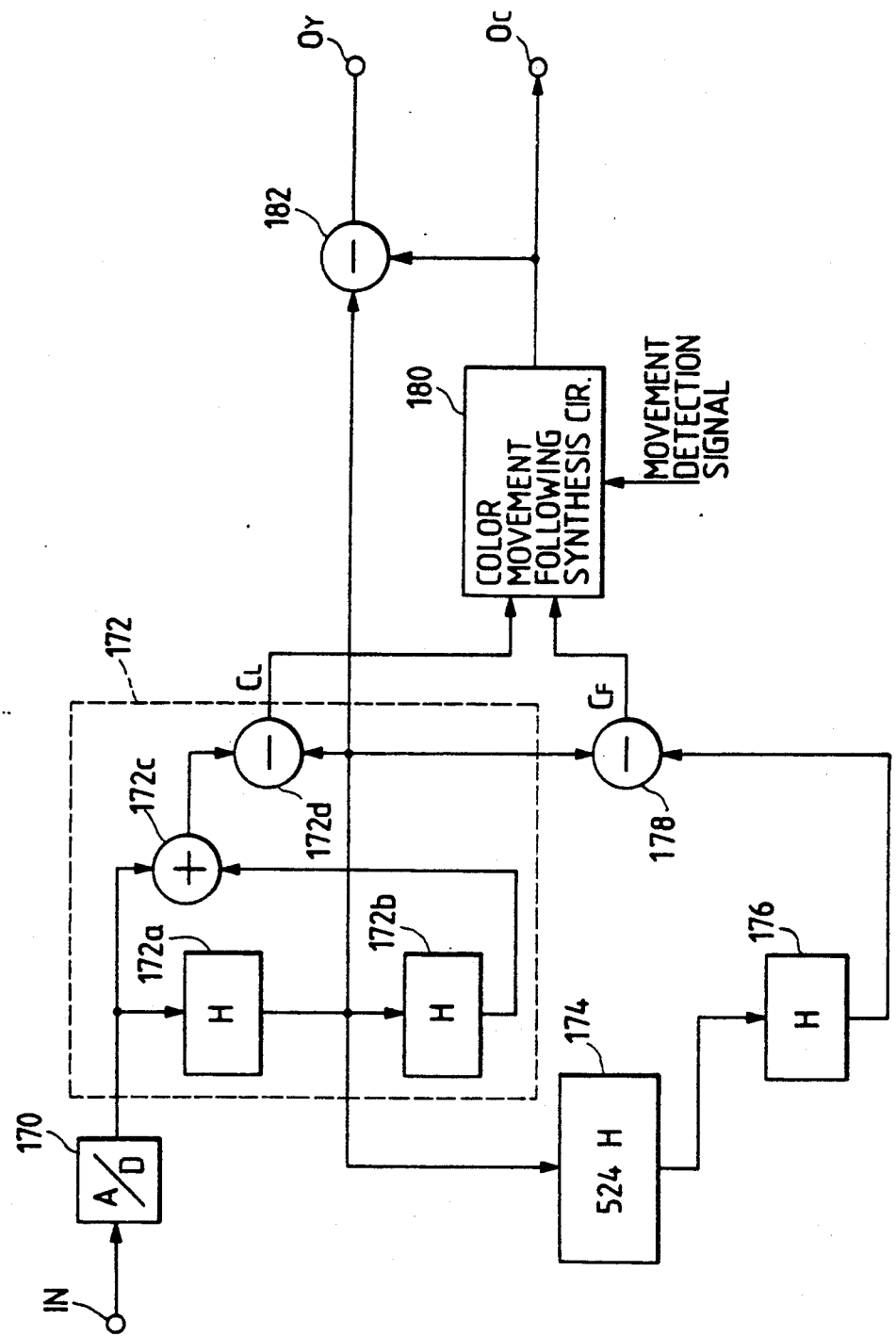
FIG. 2 is a block diagram (PRIOR ART) of a conventional Y/C separation circuit.
Figures 4A, 4B:
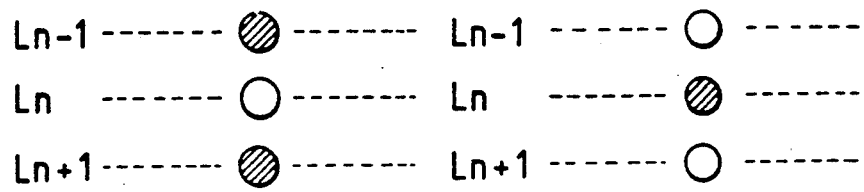
FIGS. 4A and 4B are diagrams illustrating picture element signals of adjacent scanning lines for a first and second frame.

FIGS. 4A and 4B illustrate the advantages of using the second movement detection signal during times of increasing deterioration of correlation. Assume that the luminance levels of the picture element signals appearing on the line Ln-1 immediately before the reference line Ln, the reference line Ln, and the line Ln+1 immediately after the reference line are 0 (black), 1 (white), 0 (black), respectively, in the display picture preceding to the first frame (e.g., the second frame) as shown in FIG. 4A, and 1, 0, and 1 in the display picture of the next frame (e.g., the first frame) as shown in FIG. 4B.

With the above-described averaging process of the luminance signal over the three lines, as is apparent from arrangement of the comb filters 14 and 16 in FIG. 3, the average value is produced for the lines immediately before and after the reference line, and thereafter an average value is produced between the average value just obtained and the luminance signal of the reference line. The average values of the levels of the luminance signals produced for the display picture of the first frame and the second frame are all $\frac{1}{2}$; consequently, the first movement detection signal, which is the difference between these average values, is zero. Thus the first movement detection signal cannot detect special movements that occur in the display picture.

Also, a special movement shown in FIGS. 4A and 4B cannot be detected in the case where the first movement detection signal is to be produced from the difference between frames of the luminance signal separated through the averaging process of the picture elements over two adjacent lines, as opposed to the three adjacent lines as described above. That is, for the picture elements shown in FIGS. 4A and 4B, the average value of the picture elements on the reference line Ln and the line Ln-1 immediately before the reference line is $\frac{1}{2}$; thus the difference between the two is zero.

Likewise, as shown in FIGS. 4A and 4B, the average value of the picture element signals on the reference line Ln and the line Ln-1 immediately after the reference line is $\frac{1}{2}$. Therefore, the difference between the two average values is zero.

The second movement detection signal, however, represents the difference between the frames with respect to the low-frequency component of the color signal C, e.g., the luminance signal component y that has leaked into the color signal C as the correlation between the adjacent lines deteriorates. Therefore the magnitude of the second movement detection signal increases as the correlation deteriorates, reaching a maximum magnitude when the correlation between the adjacent lines is 0%. That is, the component of the luminance signal that leaks into the color signal is y=0-1=-1 for the display picture in FIG. 4B and y'=1-0=1 for the display picture FIG. 4A, thus the absolute value of the second difference signal $\delta y$ is 2 at the maximum. For this reason the maximum value circuit 32 selects the second movement detection signal from which the movement within the display picture is detected.

Figure 5:
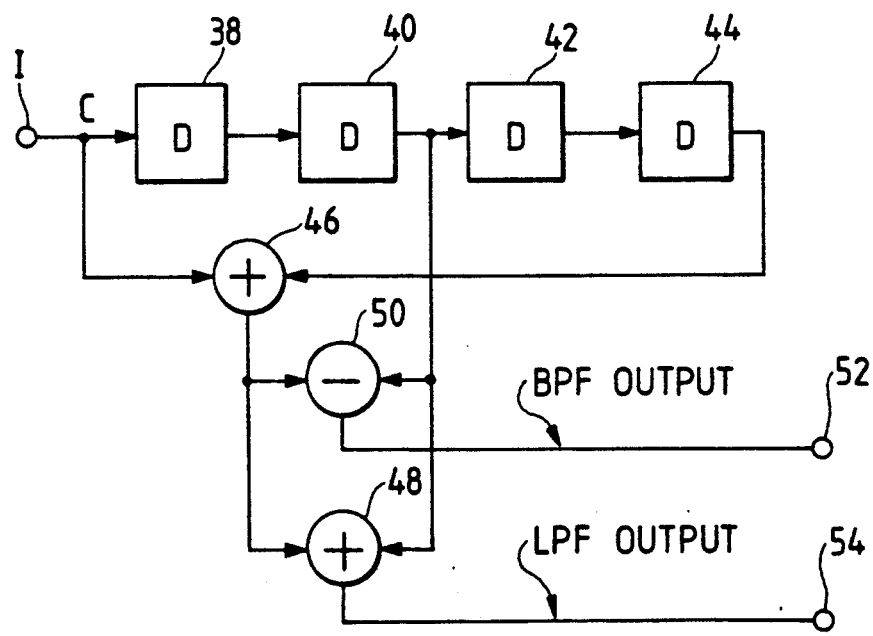
FIG. 5 is a block diagram of a filtering unit according to the first embodiment.

FIG. 5 is a block diagram of an arrangement of the filter unit 18 in FIG. 3. The filter unit 18 is formed of four cascaded delay circuits 38, 40, 42, 44 for transferring the digital color signal supplied through the input terminal I while delaying the respective sampled color signals at each sampling period. The filter unit 18 also includes adding circuits 46, 48 and a subtractor 50. The high-frequency component of color signal C that has been subjected to band pass filtering is outputted from the subtractor 50 to the output terminal 52 while the low-frequency component of color signal C (e.g., luminance signal y) that has been subjected to low-pass filtration is outputted from the adding circuit 48 to the output terminal 54. The filter unit 19 of FIG. 3 is of the same configuration as the filtering unit 18 in FIG. 5.

In this manner, an addition of one adding circuit 48 to the band pass filtering circuit as shown in the prior art circuit shown in FIG. 1 provides a low-pass filter circuit for sampling the luminance signal, thereby saving the cost by virtue of less parts count and mounting space. Thus, the apparatus as disclosed in the first embodiment may be mounted on a single IC chip, thereby minimizing space.

The first embodiment has been described in which the larger of the first and second movement detection signals is selected as the ultimate movement detection signal of the luminance signal. However, the overall circuit may also be arranged such that the first and second movement detection signals are adjusted by in a suitable synthesis ratio.

By using the difference in the luminance signal between the frames as a second auxiliary movement detection signal, the first embodiment of the present invention prevents the problems earlier described which resulted from the sole use of the first movement detection signal.

Second Embodiment

Figure 6:
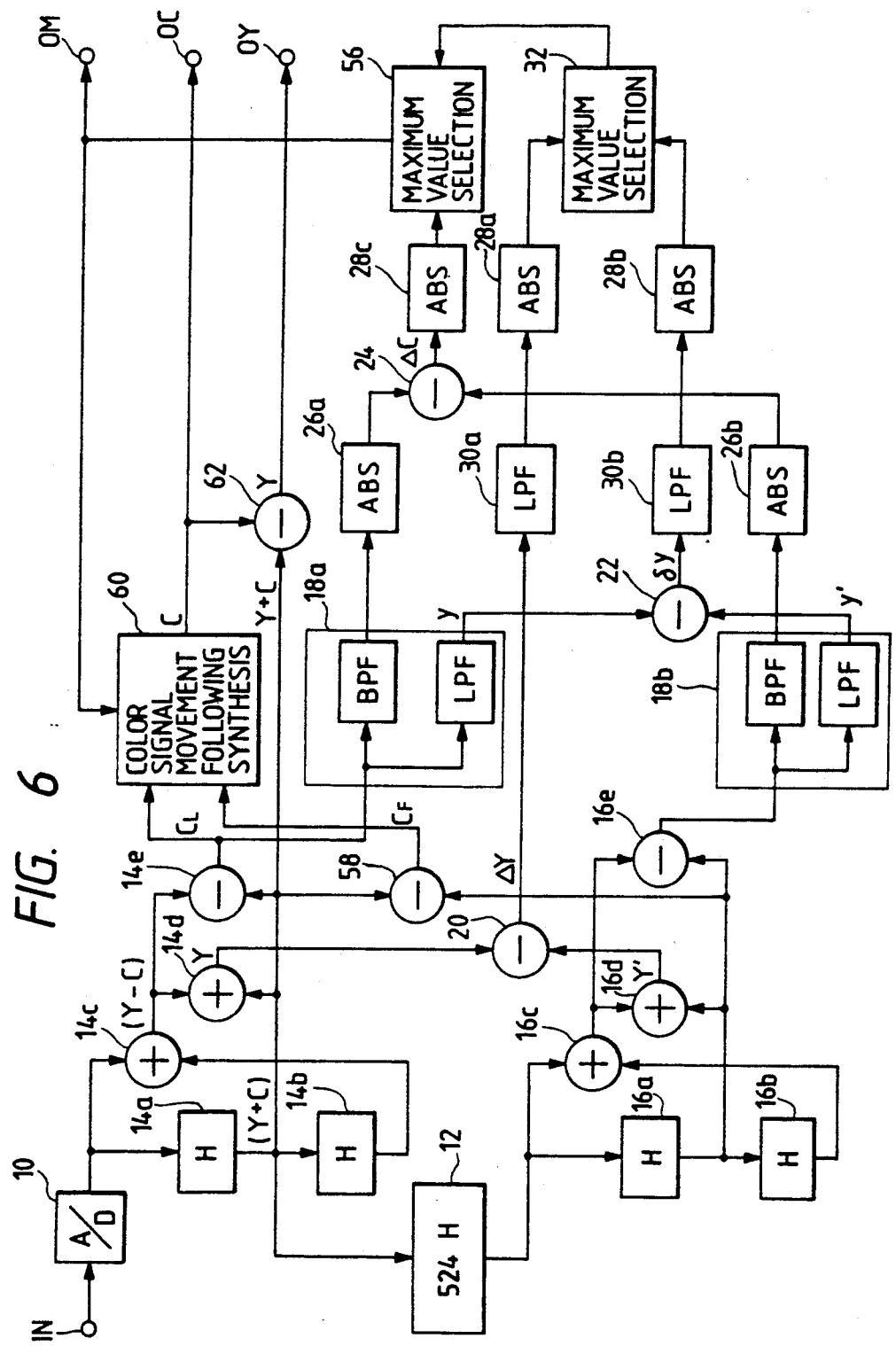
FIG. 6 is a block diagram of a second embodiment of the present invention.

FIG. 6 shows a block diagram of a second embodiment of the present invention. Those parts corresponding to similar parts in the first embodiment are designated with the same reference numerals.

The second embodiment of the present invention outputs a movement detection signal with respect to the color signal from the absolute value circuit 28c in the same manner as the first embodiment of the present invention. Also, the maximum value selection circuit 32 outputs an ultimate movement detection signal with respect to the luminance signal in the same manner as the first embodiment. Namely, the maximum value selection circuit 32 compares the first movement detection signal and the second movement detection signal, and outputs the larger as the ultimate movement detection signal with respect to the luminance signal.

According to the second embodiment of the present invention, the ultimate movement detection signal with respect to the luminance signal is input to a first input terminal of a second maximum value selection circuit 56. The movement detection signal with respect to the color signal is input to a second input terminal of the second maximum value selection circuit 56. The second maximum value selection circuit 56 then compares the two inputs, and outputs the larger as an ultimate movement detection signal to output terminal OM.

The reference line of the first frame is input to a first input terminal of a subtractor 58, and the reference line of the second frame is input to a second input terminal of the subtractor 58. Since the phase of the color signals reverses with each frame, the reference line of the first frame has a signal (Y+C), while the reference line of the second frame has a signal (Y−C). Hence, the subtractor outputs an average color signal $C_1$ which is separated from the luminance signals based upon the correlation between the adjacent first and second frames. Since the average color signal $C_1$ is separated by use of the correlation between the adjacent frames, the average color signal $C_1$ serves as a synthesis ratio which decreases as the level of the movement detection signals increases.

The average color signal $C_1$, the color signal output from the subtractor 14e of the first comb filter 14, and the ultimate movement detection signal output from the maximum value selection circuit 56 are input to a color signal movement synthesizing circuit 60, which generates and outputs a synthesized color signal C to output terminal OC. The synthesized color signal in effect is a color signal which has undergone Y/C separation; thus, since the synthesis ratio will vary in accordance with the magnitude of the ultimate movement detection signal from the maximum value selection circuit 56, the synthesized color signal provides an accurate result of Y/C separation even if there is a deterioration of correlation between the lines or frames.

The reference line of the first frame and the synthesized color signal output from the color signal movement synthesizing circuit 60 are input into a difference circuit 62. Difference circuit 62 thus outputs the color-separated luminance signal Y as a corrected luminance signal to output terminal OY.

Thus, the second embodiment of the present invention provides not only an accurate detection of movement, but also provides accurate Y/C separation, even when there is a deterioration in the correlation. Thus, the second embodiment of the present invention provides not only a circuit for detecting movement, but also a Y/C separation circuit of a movement following type which can be fabricated on a single IC chip, thereby saving mounting space and facilitating wiring work.

Third Embodiment

Figure 7:
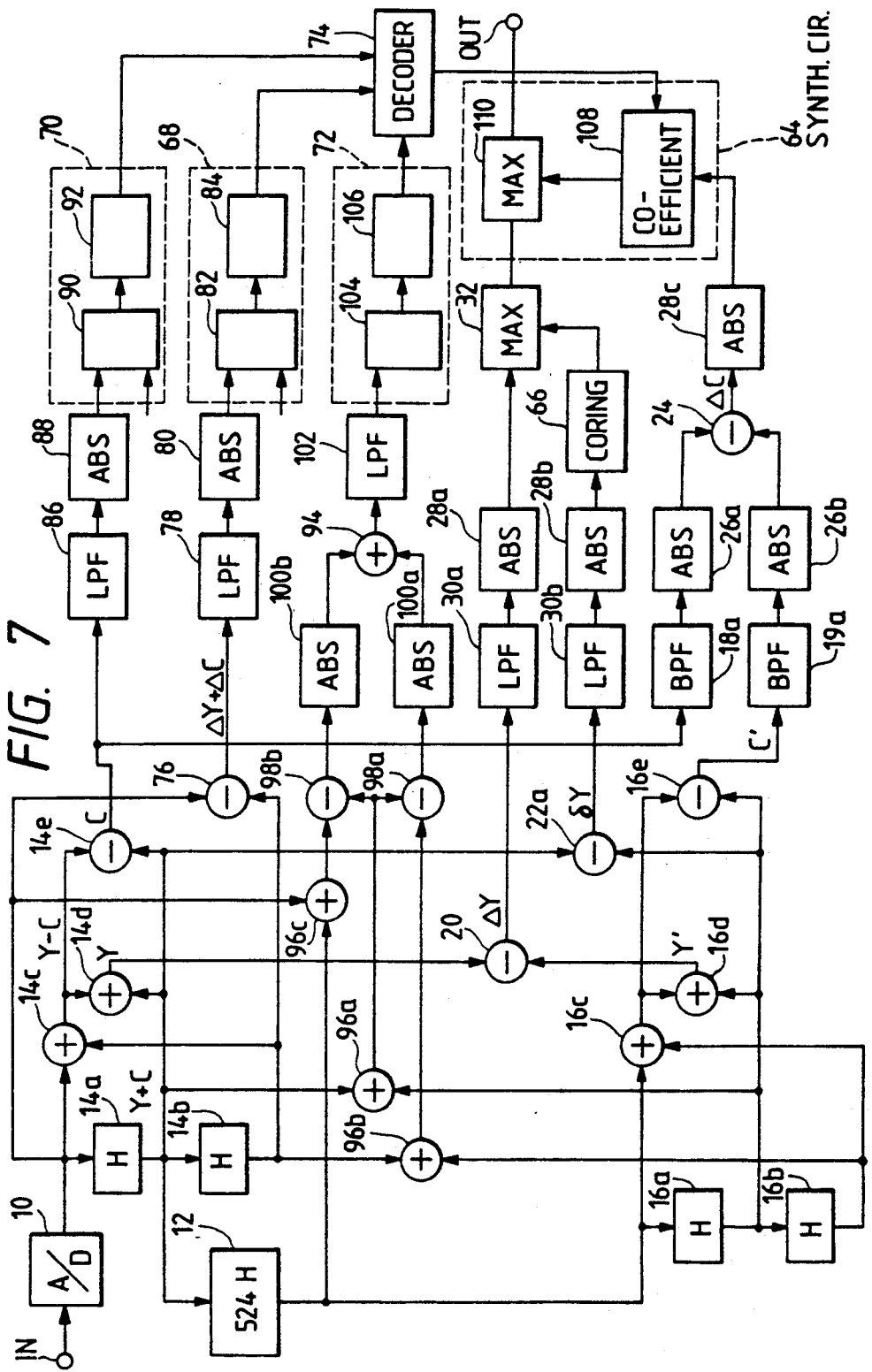
FIG. 7 is a block diagram of a third embodiment of the present invention.

FIG. 7 is a third embodiment of the present invention. Those parts corresponding to similar parts in the first embodiment are designated with the same reference numerals.

As shown in FIG. 7, the third embodiment generates a first movement detection signal with respect to the luminance signal in the same manner as the first and second embodiments of the present invention, and inputs the first movement detection signal to the first input terminal of the maximum value selection circuit 32. The third embodiment also generates the movement detection signal with respect to the color signal in the same manner as the first and second embodiments of the present invention, and inputs the movement detection signal with respect to the color signal into a first input terminal of a synthesizing circuit 64.

Unlike the first and second embodiments, however, the third embodiment generates the difference signal $\delta y$ from a difference circuit 22a by subtracting the reference line of the first frame from the reference line of the second frame. Thus, the difference circuit 22a compares the reference lines of the first and second frames before Y/C separation. The difference signal $\delta y$ is passed through the low pass filter 30b to eliminate the color signal components from the reference lines of the first and second frames. The low-frequency component of the difference signal $\delta y$ then passes through the absolute value circuit 28b, which outputs a second movement detection signal with respect to the luminance signals.

Since the difference signal $\delta y$ is obtained from the reference lines before color separation, the leakage of the color signals into the luminance component is more likely to occur in the second movement detection signal than in the first movement detection signal. Thus, a coring process is performed by a coring circuit 66, whereby the second movement detection signal is regarded as being at a zero level until it exceeds a predetermined level; thereafter, the second movement detection signal is supplied to the maximum value selection circuit 32. As a result, the maximum value selection circuit 32 will not consider the second movement detection signal until it has exceeded the predetermined level in the coring circuit 66.

Assuming the second movement detection signal exceeds the predetermined threshold, the maximum value selection circuit 32 outputs the larger of the first or second movement detection signals with respect to the luminance signal to the synthesizing circuit 64. Normally, the first movement detection signal is larger than the second movement detection signal, so that the first movement detection signal will be selected by the maximum value selecting circuit 32 as the ultimate movement detection signal of the luminance signal.

However, when special movement occurs in the picture display as shown in FIGS. 4A and 4B, the maximum value selecting circuit 32 selects the second movement detection signal to detect movement in the display picture.

The synthesizing circuit 64 compares the ultimate movement detection signal with respect to luminance and the movement detection signal with respect to color in accordance with a detected deterioration of correlation. In particular, first correlation detector 68, second correlation detector 70 and third correlation detector 72 detect a first, second and third deterioration of correlation, respectively. A decoder 74 outputs to the synthesizing circuit 64 a coefficient in response to the first, second and third deterioration of correlation level. The coefficient provides a weighted value to compensate for the deterioration of correlation. Thus, the synthesizing circuit outputs an ultimate movement detection signal which avoids errors due to a deterioration of correlation.

The operation of the correlation detectors 68, 70, 72 and the decoder 74 will become more apparent with the following description. For notation purposes, the first and second adjacent signals of the first frame refer to the adjacent lines output from the one-line delay circuit 14b and the A/D converter 10, respectively; and the first and second adjacent signals of the second frame refer to the adjacent lines output from the one-line delay circuit 16b and the frame delay circuit 12, respectively.

A subtractor 76 outputs a difference between the first and second adjacent signals in the first frame. The first correlation detector 68 receives a low frequency component of the difference output by subtractor 76 via a low pass filter 78, which rejects the color signal component of the difference output by the subtractor 76. Thus, the first correlation detector 68 receives a difference in the luminance signal between the adjacent lines in the first frame.

The difference in the luminance signal between the adjacent lines received by the first correlation detector 68 passes through an absolute value circuit 80 to be converted into a signal of non-polarity which indicates the degree of deterioration of the correlation between the lines; the signal of non-polarity is input into a comparing circuit 82, which outputs a first "high" signal when the signal of non-polarity is greater than a predetermined level. The first "high" signal is latched by the extension circuit 84 and output to the decoder 74.

The second correlation detector 70 receives a low frequency component of the Y/C separated color signal C of the first frame from the subtractor 14e (e.g., the luminance component that leaked into the color signal C as correlation deteriorates) via a low pass filter 86. Like the first correlation detector 68, the low frequency component of the Y/C separated color signal C passes through an absolute value circuit 88 to be converted into a signal of e non-polarity which indicates the degree of deterioration of the correlation between the lines; the signal of non-polarity is input into a comparing circuit 90, which outputs a second "high" signal when the signal of non-polarity is greater than a predetermined level. The second "high" signal is latched by the extension circuit 92 and output to the decoder 74.

The third correlation detector 72 receives a low frequency output of a correlation detection signal output by an adding circuit 94. Each of the adding circuits 96a, 96b and 96c outputs a first, second and third average luminance signal between the first and second frame of the luminance signals of the reference lines, the luminance signals of the first adjacent lines, and the luminance signals of the second adjacent lines, respectively. A subtractor 98a outputs the difference between the first and second average luminance signals, and a subtractor 98b outputs the difference between the first and third average luminance signals. The difference signals from the subtractors 98a and 98b are output to via absolute value circuits 100a and 100b to the adding circuit 94.

The adding circuit 94 outputs the correlation detection signal to a low pass filter 102 to eliminate any high-frequency color component signals. The third correlation detector 72 receives the low frequency component of the correlation detection signal from the low pass filter 102 and inputs the signal into a comparing circuit 104, which outputs a third "high" signal when the low frequency component of the correlation detection signal is greater than a predetermined level. The third "high" signal is latched by the extension circuit 92 and output to the decoder 74.

The decoder 74 outputs a coefficient of 1, 0.5, 0.25 or 0, depending on whether the decoder receives zero, one, two or all three "high" signals, respectively, from the first, second and third correlation detectors 68, 70 and 72. This coefficient may be considered as a synthesis ratio, such that the synthesis ratio of the movement detection signal output from the synthesizing circuit 64 decreases as the correlation between the lines deteriorates. Thus, if the decoder receives the first, second and third "high" signals simultaneously, indicating a maximum deterioration of correlation, the coefficient output as the synthesis ratio of the ultimate movement detection signal has a value of 0.

The synthesizing circuit 64 includes a coefficient circuit 108 for biasing the movement detection signal with respect to color in accordance with the coefficient output by the decoder 74, and a maximum value selection circuit 110 which outputs the greater of the ultimate movement detection signal with respect to luminance or the biased signal from the coefficient circuit 108. The output of the maximum value selection circuit 110 is sent to an output terminal OUT as the ultimate movement detection signal.

According to the third embodiment of the present invention, the maximum value selecting circuit 110 outputs the ultimate movement detection signal after comparison between the ultimate movement detection signal with respect to the luminance signal and the biased signal which is biased by a synthesis ratio (e.g., the coefficient from the decoder 74). Similarly, the maximum value selecting circuit 32 may be modified to select the ultimate movement detection signal with respect to luminance in accordance with a suitable synthesis ratio, thus biasing the first movement detection signal over the second movement detection signal as the correlation between lines deteriorates.

The third embodiment of the present invention provides three correlation detection systems in order to select a synthesis ratio which varies in accordance with the degree of the detected deterioration of correlation. However, advantages of the third embodiment may be realized by using solely the first correlation detector 68. Thus, the third embodiment enables biasing of the movement detection signal with respect to the color signal, such that the synthesis ratio of the movement detection signal with respect to the color signal decreases as the correlation between lines deteriorates. Thus, the present invention prevents erroneous detection of a false movement due to leaking of the luminance signals into the color signals during deterioration of correlation.

Fourth Embodiment

Figure 8:
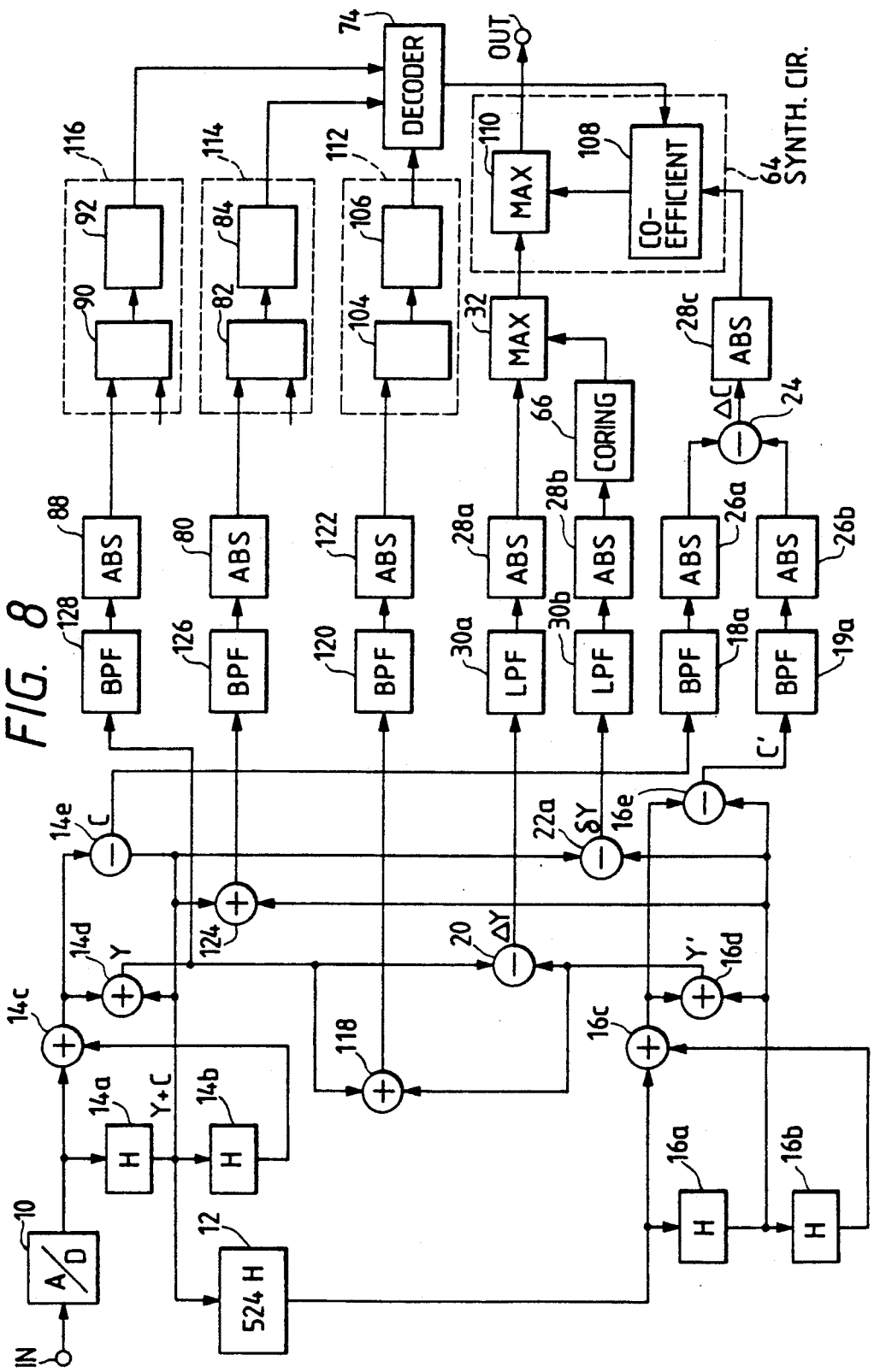
FIG. 8 is a block diagram of a fourth embodiment of the present invention.

FIG. 8 is a fourth embodiment of the present invention. Those parts corresponding to similar parts in the previous embodiments are designated with the same reference numerals.

As shown in FIG. 8, the fourth embodiment outputs from the maximum value selection circuit 32 an ultimate e movement detection signal with respect to the luminance signal in the same manner as the third embodiment of the present invention. The fourth embodiment also generates the movement detection signal with respect to the color signal in the same manner as the first, second and third embodiments of the present invention, and inputs the movement detection signal with respect to the color signal into the first input terminal of the synthesizing circuit 64.

In addition, the fourth embodiment generates in the same manner as the third embodiment the difference signal δy from the difference circuit 22a to compare the reference lines of the first and second frames before Y/C separation. The difference signal δy is passed through the low pass filter 30b to eliminate the color signal components from the reference lines of the first and second frames. The low-frequency component of the difference signal δy then passes through the absolute value circuit 28b, which outputs the second movement detection signal to the coring circuit 66.

While the fourth embodiment has the same decoder 74 as the third embodiment, the fourth embodiment provides first, second and third correlation detectors 112, 114 and 116, each of which detect the high frequency color components which have leaked into the luminance signals. In particular, the first correlation detector detects the high frequency component of the average of Y/C separated luminance signals between frames. The second correlation detector 114 detects the high frequency component of the average luminance signal between the reference lines of the first and second frames before Y/C color separation. The third correlation detector 116 detects the high frequency component of the luminance signal resulting from Y/C separation between the reference line and an adjacent line in the reference frame.

An adding circuit 118 outputs a first average luminance signal, which represents the average of Y/C separated luminance signals between frames from adding circuits 14d and 16d. The first average luminance signal is input to a band pass filter 120 which rejects the luminance component and passes only the high frequency component of the first average luminance signal (i.e., the color signal leaking into the first average luminance signal). The high frequency component of the first average luminance signal passes through an absolute value circuit 122 to comparison circuit 104, which outputs a first "high" signal when the signal output from the absolute value circuit 122 exceeds a predetermined level. The first "high" signal is latched by the extension circuit 106 and output to the decoder 74.

An adding circuit 124 outputs a second average luminance signal, which represents the average of luminance signals between frames from the reference lines. The second average luminance signal is input to a band pass filter 126 which rejects the luminance component and passes only the high frequency component of the second average luminance signal. The high frequency component of the second average luminance signal passes through an absolute value circuit 80 to comparison circuit 82, which outputs a second "high" signal when the signal output from the absolute value circuit 80 exceeds a predetermined level. The second "high" signal is latched by the extension circuit 84 and output to the decoder The third correlation detector 116 receives the high frequency component of the Y/C separated luminance signal from the adding circuit 14e via a band pass filter 128. The high frequency component of the second average luminance signal passes through an absolute value circuit 88 to comparison circuit 90, which outputs a third "high" signal when the signal output from the absolute value circuit 88 exceeds a predetermined level. The third "high" signal is latched by the extension circuit 92 and output to the decoder 74.

As described in the third embodiment, the decoder 74 outputs a coefficient of 1, 0.5, 0.25 or 0, depending on whether the decoder receives zero, one, two or all three "high" signals, respectively. Thus, the synthesizing circuit 64 receives the synthesis ratio of the movement detection signal with respect to the color signal in accordance with the detected level of deterioration of correlation In the fourth embodiment, the correlation detectors 112, 114 and 116 detect the level of deterioration of correlation based on the presence of the high-frequency color signal which leaks into the luminance signal. Note that the advantages of the fourth embodiment may be realized by using solely the first correlation detector 112.

The present invention prevents erroneous detection of a false movement due to leaking of the luminance signals into the color signals during deterioration of correlation. Further, the present invention provides corrected Y/C signals which are synthesized in accordance with the detected deterioration of correlation. Finally, the present invention provides an ultimate movement detection signal which biases a movement detection signal with respect to the color signal in accordance with the detected deterioration of correlation. Thus, the present invention enables accurate Y/C separation and detection of movement despite a deterioration of correlation between the lines or frames of the display picture.

It should be readily apparent that the disclosed embodiments may undergo numerous modifications while still achieving the objectives of the present invention. Therefore, while this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for detecting a movement in a television display picture comprising:

first filtering means for Y/C separating a luminance signal and a color signal of a first frame of said television signal, said filtering means separating said luminance signal and said color signal in accordance with a correlation among at least three adjacent lines of said first frame;

frame delay means for storing a second frame of said television display picture, said second frame being adjacent to said first frame;

second filtering means for Y/C separating a luminance signal and a color signal of said second frame stored in said frame delay means, said second filtering means separating said luminance signal and said color signal of said second frame in accordance with a correlation among at least three adjacent lines of said second frame, said three adjacent lines of said second frame corresponding to said three adjacent lines of said first frame;

first difference means, responsive to said luminance signals from said first and second filtering means, for generating a first movement detection signal, said first movement detection signal being indicative of movement of said luminance signals of said first and second frame;

second difference means, responsive to said first and second filtering means, for generating a second movement detection signal, said second movement detection signal being an auxiliary movement detection signal indicative of movement of luminance of said first and second frame;

third difference means, responsive to high frequency components of said color signals from said first and second filtering means, for generating a third movement detection signal, said third movement detection signal being indicative of movement of said color signals of said first and second frame; and first value detecting means, responsive to said first and second movement detection signals, for generating a fourth movement detection signal, said fourth movement detection a signal indicating a maximum luminance deviation in said television display picture.

2. An apparatus as recited in claim 1, wherein said second difference means generates said second movement detection signal in response to low frequency components of said color signals from said first and second filtering means.

3. An apparatus as recited in claim 2, wherein said first value detecting means outputs a larger of said first and second movement detection signals.

4. An apparatus as recited in claim 3, wherein:

said first difference means comprises subtractor means for generating a first difference between said luminance signals from said first and second filtering means, a low pass filter for generating a low frequency component of said first difference, and absolute value means for outputting as said first movement detection signal an absolute value of said low frequency component of said first difference; and said second difference means comprises subtractor means for generating a second difference between said low frequency components of said color signals from said first and second filtering means, a low pass filter for generating a low frequency component of said second difference, and absolute value means for outputting as said second movement detection signal an absolute value of said low frequency component of said second difference.

5. An apparatus as recited in claim 2, further comprising:

fourth difference means, responsive to one of said three lines of said first frame and a corresponding one of said three lines of said second frame, for generating an average color signal;

second value detecting means, responsive to said fourth a movement detection signal and said third movement detection signal, for generating an ultimate movement detection signal;

synthesizing mean for generating a synthesized color signal, said synthesizing means being responsive to said color signal from said first filtering means, said average color signal from said fourth difference means, and said ultimate movement detection signal; and fifth difference means, responsive to said synthesized color signal and said one of said three lines of said first frame, for generating a corrected luminance signal.

6. An apparatus as recited in claim 1, wherein:

said at least three adjacent lines of said first frame and said second frame are each composed of a reference line, a first adjacent line and a second adjacent line, said first and second adjacent lines being adjacent to said reference line; and said second difference means generates said second a movement detection signal in response to said reference line of said first frame and said reference line of said second frame.

7. An apparatus as recited in claim 6, further comprising;

first detecting means for detecting a first deterioration of correlation, said first detecting means being responsive to a low frequency component of a difference between said first and second adjacent lines of said first frame;

means for outputting a coefficient in response a to said first deterioration of correlation; and synthesizing means, responsive to said coefficient, said fourth movement detection signal and detection signal, for outputting an ultimate movement detection signal.

8. An apparatus as recited in claim 7, wherein said synthesizing means comprises:

coefficient means for biasing said third movement detection signal in accordance with said coefficient, said coefficient means outputting a synthesis ratio in accordance with said biasing; and second value detecting means for outputting said a ultimate movement detection signal in response to said synthesis ratio and said fourth movement detection signal.

9. An apparatus as recited in claim 7, further comprising:

second detecting means for detecting a second deterioration of correlation, said second detecting means being responsive to said color signal output from said first filtering means;

first luminance averaging means for outputting a first, second and third average luminance signal, said first average luminance signal being responsive to said reference lines of said first and second frames, said second average luminance signal being responsive to said first adjacent lines of said first and second frames, and third average luminance signal being responsive to said second adjacent lines of said first and second frames;

second luminance averaging means for outputting a correlation detection signal, said correlation detection signal being an average of a difference between the first and second average luminance signals, and a difference between the first and third average luminance signals; and third detecting means for detecting a third deterioration of correlation, said third detecting means being responsive to a low frequency component of said correlation detection signal;

wherein said means for outputting said coefficient outputs said coefficient in response to said second and third deteriorations of correlation.

10. An apparatus as recited in claim 9, wherein said first value detecting means includes coring means for disregarding said second movement detection signal until said second movement detection signal exceeds a predetermined threshold.

11. An apparatus as recited in claim 6, further comprising:

first luminance averaging means, responsive to said luminance signals from said first and second filtering means, for generating a first average luminance signal;

first detecting means for detecting a first deterioration of correlation, said first detecting means being a responsive to a high frequency component of said first average luminance signal;

means for outputting a coefficient in response to said first deterioration of correlation; and synthesizing means, responsive to said coefficient, said fourth movement detection signal and said third movement detection signal, for outputting an ultimate movement detection signal.

12. An apparatus as recited in claim 11, wherein said synthesizing means comprises:

coefficient means for biasing said third movement detection signal in accordance with said coefficient, said coefficient means outputting a synthesis ratio in accordance with said biasing; and second value detecting means for outputting said ultimate movement detection signal in response to said synthesis ratio and said fourth movement detection signal.

13. An apparatus as recited in claim 11, further comprising:

second luminance averaging means, responsive to the reference line of the first and second frames, for generating a second average luminance signal;

second detecting means for detecting a second deterioration of correlation, said second detecting means being responsive to a high frequency component of said second average luminance signal; and third detecting means for detecting a third deterioration of correlation, said third detecting means being responsive to a high frequency component of said luminance signal output by said first filtering means;

wherein said means for outputting said coefficient outputs said coefficient in response to said second and third deteriorations of correlation.

14. An apparatus as recited in claim 13, wherein said first value detecting means includes coring means for disregarding said second movement detection signal until said second movement detection signal exceeds a predetermined threshold.

15. A method for detecting a movement in a television display picture having a first and second frame, comprising the steps of:

first separating a luminance signal and a color signal of said first frame;

second separating a luminance signal and a color signal of said second frame;

first generating a first movement detection signal, said first movement detection signal representing a difference between said luminance signals of said first and second frame;

second generating a second movement detection signal, said second movement detection signal being indicative of movement of luminance between said first and second frame;

filtering said color signals of said first and second frames to obtain high frequency components of said color signals of said first and second frames;

third generating a third movement detection signal, a said third movement detection signal representing a difference between said high frequency components of said color signals from said first and second frames;

comparing said first and second movement detection signals to obtain a comparison result, said comparison result indicating a maximum luminance deviation in said television display picture: and outputting a fourth movement detection signal in accordance with said comparison result.

* * * * *